(12) United States Patent
Jerregard et al.

(10) Patent No.: US 7,209,802 B2
(45) Date of Patent: Apr. 24, 2007

(54) METHOD FOR CONTROLLING A ROBOT

(75) Inventors: Henrik Jerregard, Fort Collins, CO (US); Niclas Pihl, Brakne Hoby (SE)

(73) Assignee: ABB AB, Västerås (SE)

( * ) Notice: Subject to any disclaimer, the term of this patent is extended or adjusted under 35 U.S.C. 154(b) by 0 days.

(21) Appl. No.: 10/973,981

(22) Filed: Oct. 27, 2004

(65) Prior Publication Data
US 2005/0143858 A1    Jun. 30, 2005

(51) Int. Cl.
*G06F 19/00* (2006.01)
(52) U.S. Cl. .................. 700/245; 700/254; 219/121.72; 376/261; 180/204
(58) Field of Classification Search .................. 700/245
See application file for complete search history.

(56) References Cited

U.S. PATENT DOCUMENTS

| | | | |
|---|---|---|---|
| 3,661,376 A | | 5/1972 | Hill et al. |
| 4,748,867 A | | 6/1988 | Susnjara |
| 4,944,445 A | * | 7/1990 | Zimmer ...................... 228/102 |
| 5,098,644 A | * | 3/1992 | McDaniels .................. 376/261 |
| 5,194,216 A | * | 3/1993 | McDaniels, Jr. ............ 376/261 |
| 5,466,909 A | * | 11/1995 | Nihei et al. ............ 219/121.72 |
| 5,889,925 A | * | 3/1999 | Tsurutani et al. ........... 700/254 |
| 6,064,168 A | | 5/2000 | Tao et al. |
| 6,649,123 B2 | * | 11/2003 | Babai .......................... 266/76 |
| 2004/0093119 A1 | * | 5/2004 | Gunnarsson et al. ........ 700/245 |

OTHER PUBLICATIONS

Widen, Permanova lasersystem AB, 203, Internet, p. 1-44.*
Wang et al., Laser garment cut robot system: Design and realiztion, 1999, IEEE, p. 1084-1089.*
Pool-Info: Handling; Robotik: Neues von Reis Robotics; Dem Laser Sein Handling; Plastverarbeiter 54.Jahrq.; 2003.
Yuntau Wang et al; Laser Garment Cut Robot System: Design and Realization; Proceedings of the 1999 IEEE International Conference on Robotics & Automation; May 1999; pp. 1084-1089.
PERMANOVA Lasersystem AB, ALAW 2003, Laser Cells for In-Line BiW Applications, Urban Widen; 44 Pages.

* cited by examiner

*Primary Examiner*—Thomas Black
*Assistant Examiner*—McDieunel Marc
(74) *Attorney, Agent, or Firm*—Venable LLP; Eric J. Franklin

(57) ABSTRACT

A method for controlling a robot wherein a procedure is carried out with the robot while maintaining the robot immobile in axes that are not required to carry out the procedure.

13 Claims, 5 Drawing Sheets

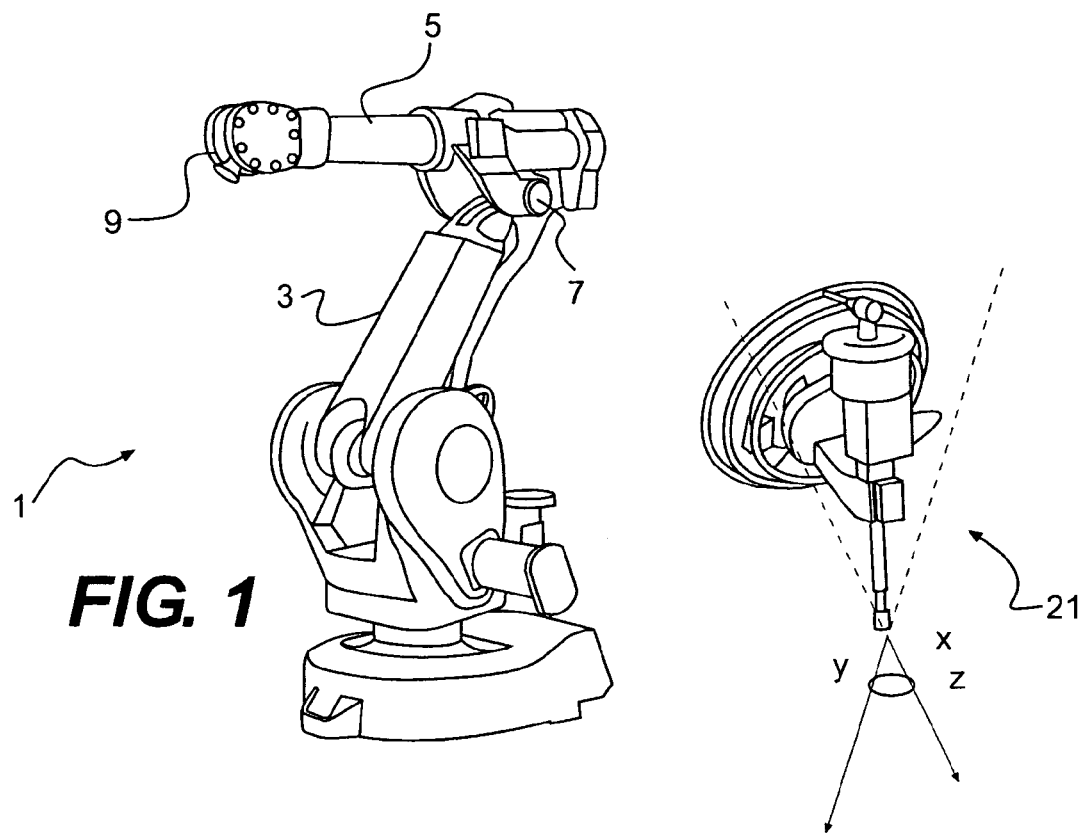
FIG. 1
FIG. 2
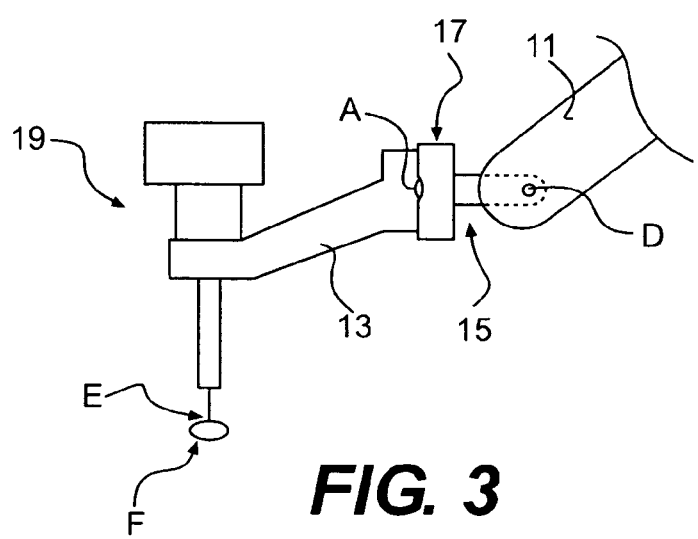
FIG. 3

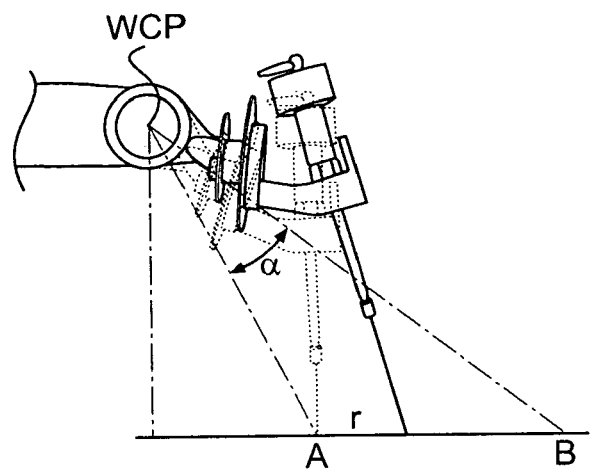
FIG. 7
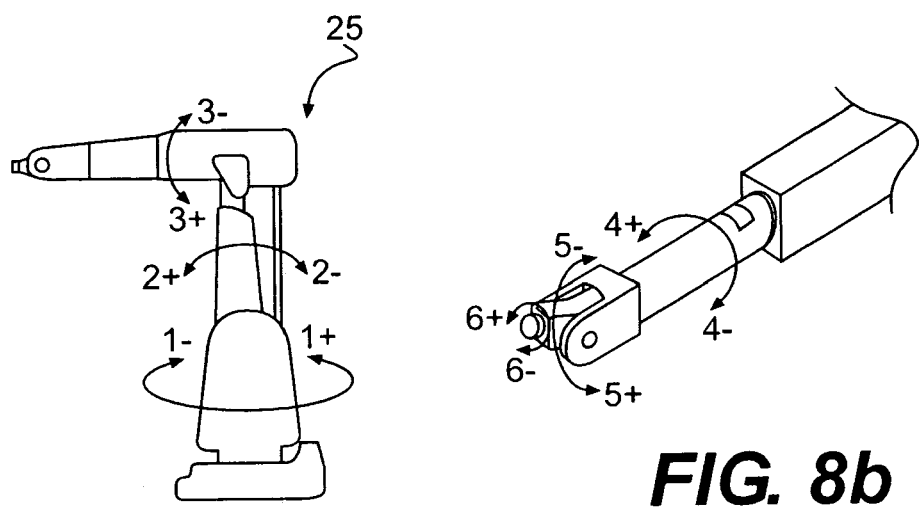
FIG. 8a
FIG. 8b

METHOD FOR CONTROLLING A ROBOT

CROSS-REFERENCE TO RELATED APPLICATION

This application claims priority to U.S. provisional patent application 60/514,479 filed Oct. 27,2003.

FIELD OF THE INVENTION

The present invention relates to method for controlling industrial robots or manipulators. Additionally, the present invention relates to industrial robots and manipulators.

BACKGROUND OF THE INVENTION

Industrial robots and manipulators are utilized to carry out an increasing variety of functions. While it is always desirable to accurately process and manipulate a workpiece accurately, there may be times when it is particularly important. Some applications require tolerances of ±0.1 mm for geometries smaller than 20 mm. Accurate processing and manipulation of workpieces requires accurate set up and calibration as well as movement of robots and manipulators.

SUMMARY OF THE INVENTION

The present invention includes a method for controlling a robot. The method includes carrying out a procedure with the robot while maintaining the robot immobile in axes that are not used during the procedure.

The present invention also includes a method for controlling a robot. The method includes centering a tool over a center of a region of a workpiece on which a procedure is to be carried out. A tool center point is moved to coincide with a wrist center point. A relationship is obtained between a first reorientation angle in a first plane and a limit of movement of the robot in the first plane during the procedure. A relationship is obtained between a second reorientation angle in a second plane and a limit of movement of the robot in the second plane during the procedure. Maximum and minimum values of the first reorientation angle and the second reorientation angle are calculated. The procedure is carried out.

Furthermore, the present invention includes an industrial robot. The robot includes a plurality of interconnected arms. Each arm is movable about at least one axis. A tool is arranged on one of the arms. A controller is operative to control movement of the arms and tool to immobilize at least one of the arms about the at least one axis while carrying out a procedure on a workpiece with the tool.

Further objectives and advantages, as well as the structure and function of exemplary embodiments will become apparent from a consideration of the description, drawings, and examples.

BRIEF DESCRIPTION OF THE DRAWINGS

The foregoing and other features and advantages of the invention will be apparent from the following, more particular description of exemplary embodiments of the invention, as illustrated in the accompanying drawings wherein like reference numbers generally indicate identical, functionally similar, and/or structurally similar elements, in which:

FIG. 1 represents an embodiment of a robot with which methods according to the present invention may be utilized;

FIG. 2 represents an embodiment of a water jet cutting tool that may be attached to a robot to carry out a procedure according to the present invention;

FIG. 3 represents an embodiment of a robot and a cutting tool with which methods according to the present invention may be utilized;

FIG. 4d represents a cross-sectional view of the tool shown in FIGS. 4a and 4b taken along the line B—B in FIG. 4a;

FIG. 7 represents an illustration of measurements according to the embodiment of the method described in the flow-chart shown in FIG. 5; and FIGS. 8a and 8b represent an embodiment of a robot with six degrees of freedom of movement.

DETAILED DESCRIPTION OF THE INVENTION

Figure 4A:
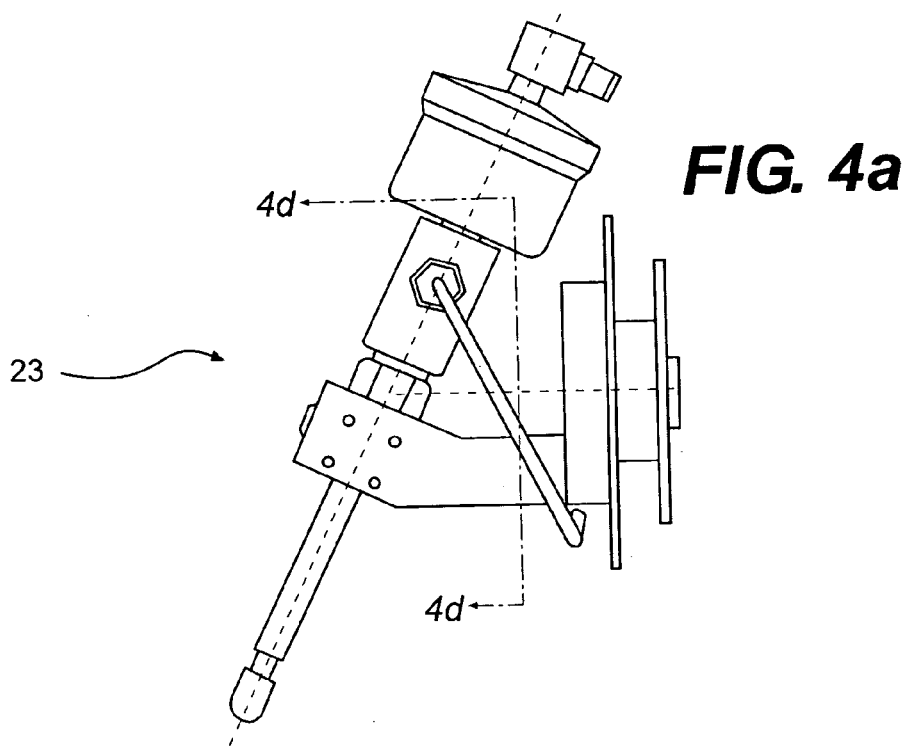
FIGS. 4a and 4b represent opposite side detailed views of an embodiment of a cutting tool that may be attached to a robot to carry out a procedure according to the present invention.

Embodiments of the invention are discussed in detail below. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without parting from the spirit and scope of the invention.

Robots and manipulators typically have large friction/tolerances in their shafts/axes. These frictional forces must be overcome when carrying out movement of the robot or manipulator. Also, the tolerances must be accounted for in defining the movement necessary to carry out an operation. These frictional forces and tolerances can be multiplied many times over for each shaft and axis and can greatly affect movement of robots and manipulators.

Methods according to the present invention permit operations to be carried out by industrial robots and manipulators with very high precision. This can be accomplished by minimizing the number of axes/shafts that are moved during any procedure. By minimizing or eliminating movement of a shaft or axis, the amount of friction/tolerance that must be accounted for in the procedure will be reduced. This can permit procedures to be carried out with greater precision.

Methods and principles according to the present invention may be utilized with any procedure. For example, the present invention can be used to control a robot for any cutting procedure, such as cutting with by laser, waterjet, abrasive waterjet, and/or milling. Of course, virtually any procedure carried out with a robot or manipulator could benefit from increased precision made possible according to embodiments of the present invention.

Embodiments of the present invention are particularly useful to meet demand regarding tolerances and/or path following when cutting holes where it is critical to produce an exact shape. For example, embodiments of the present invention are especially useful in forming holes in objects where the holes must be precisely shaped and arranged on the object. One such example is in the making of a door panel made of aluminum that needs a number of exactly made holes for assembly of other components to the door, such as clips. Another example of a procedure that embodiments of the present invention may be particularly useful for carrying out is in making holes with a diameter of less than about 20 mm. Embodiments of the invention may be especially useful in forming holes having a diameter of about 6 mm. Embodiments of the present invention may also be particularly useful where the tolerances in holes are less than about ±0.1 mm, particularly for geometries of less than about 20 mm in a three dimensional process. If the procedure involves forming holes, the holes could be any shape, for example, circles, squares, ovals and any other shape. In addition to permitting more precise placement of holes, the present invention can prevent or eliminate distortion of holes being cut.

Examples of specific applications of methods according to the present invention include cutting components for cars, such as floor mats, ceilings, dashboards, door panels, trunk mats, torpedo mats, among others. The invention is also suitable for producing parts for ships and the aircraft industry.

By providing precise operation, embodiments of the present invention can address functional and aesthetic demands. For example, precisely forming holes can provide a better fit for, for example, clips or guide pins where two objects are to be mounted against each other. It may also be important that, for example, holes have a particular appearance, such as round holes that really look round.

Typical industrial robots and manipulators include a number of shafts that can move and rotate. For example, FIG. 1 illustrates an embodiment of an industrial robot that the present invention may be useful with. The embodiment of the robot 1 shown in FIG. 1 includes a number of arms such as arms 3 and 5. Each arm may rotate about a joint with an adjacent arm such as joint 7. Each arm may also rotate about its axis. A tool 9 may be mounted at an end of the arm 5. A robot or manipulator may include a controller operative to control the robot/manipulator in accordance with the invention as described below.

Figure 4B:
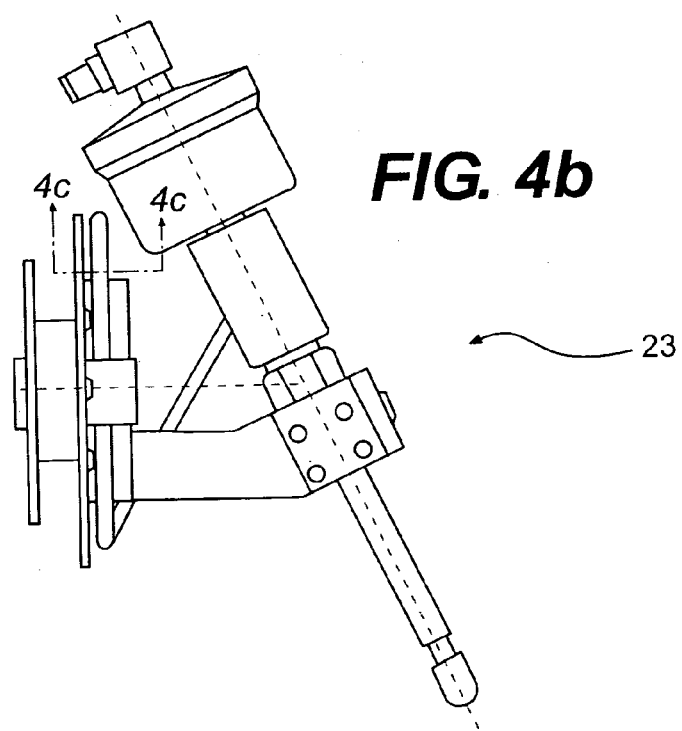
Figure 4C:
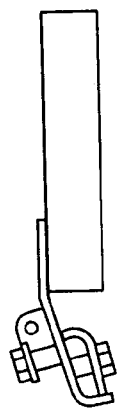
FIG. 4c represents a cross-sectional view of the tool shown in FIGS. 4a and 4b taken along the line A—A in FIG. 4b.
Figure 4D:
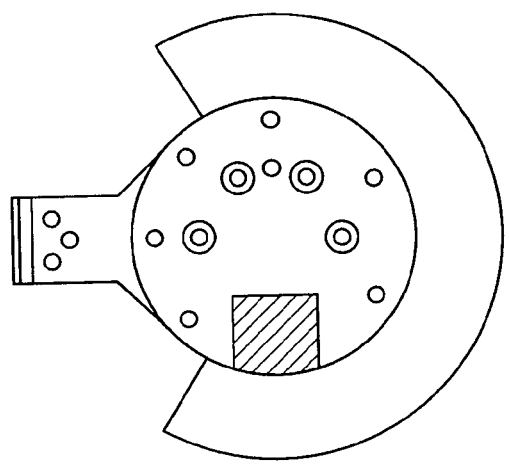
Figure 4E:
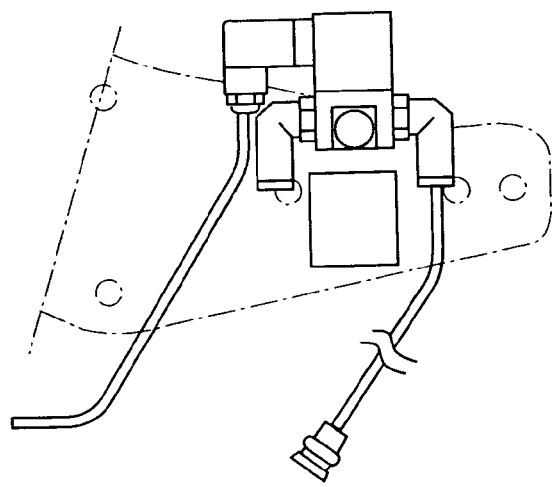
FIG. 4e represents a close-up view of a portion of the tool shown in FIGS. 4a and 4b.

Examples of tools that may be mounted on the robot include laser cutting tools, water jet cutting tools, abrasive water jets, and/or milling tools. FIGS. 2 and 4a–4e illustrate examples of a water jet tool 21 and 23, respectively, that the present invention may be utilized for controlling. FIGS. 4b and 4c represent cross-sectional views along the lines B—B in FIG. 4a and A—A in FIG. 4b, respectively, showing details of a connection between the tool and the arm of the robot. Significantly, the present invention may be utilized with any robot or manipulator, such as those available from ABB, KUKA, Motorman, among others.

To permit more precise control of a robot, methods according to the present invention can exclude one or more axes. In other words, one or more of the arms will be immobile about one or more axes of movement during the processing, such as hole cutting. Excluding one or more axes reduces the influence of friction and tolerances for the robot/manipulator when following a given path. According to typical embodiments, all axes that are not used will be totally inactive or still during a procedure. Best tolerances may be achieved when using as few axes as possible during a procedure. Typically, only one or more axes are moved, which are located closest to the process and/or tool. This typically results in considerable improvement of the tolerances that can be achieved during a procedure.

For example, the robot shown in FIG. 1 has six axes. FIGS. 8a and 8b illustrate another embodiment of a robot 25 having six degrees of freedom labeled, 1–6. Movement in each degree of freedom may be in a + (plus) or − (minus) direction about an axis. It may be possible to exclude three or four of the axes during a procedure. According to one embodiment, axes 1–3 may be excluded. According to this embodiment, axis 4 may also be excluded. However, it is not necessary to exclude axis 4, but may be easier to implement the embodiment.

The axis(es) that is/are excluded may be selected based upon a number of factors. For example, the axes may be excluded based upon momentum and/or friction. Those axes having the highest momentum and/or friction may be excluded. In the case of a robot with six axes, this typically means that axes 1–3 will be excluded. Axis 4 may also be excluded. This may not be necessary, but may be easier to implement.

FIG. 3 illustrates a close-up view of an embodiment of a cutting tool that the present invention may be utilized with. Along these lines, FIG. 3 shows a first arm 11 and a second arm 13. The arms are connected with shaft 15 and shaft 17. Shaft 15 rotates about axis D and shaft 17 rotates about axis A. A tool 19 is mounted on the end of arm 13. The tool has a tool center point E. FIG. 3 illustrates a path F that the tool would follow in an exemplary procedure.

According to one particular embodiment, only the outer axis or wrists of a robot move when carrying out a procedure, which includes forming a hole. A certain conicity may arise during the hole-cutting. However, this may be of no practical importance as long as the material is not too thick. If a round hole is to be created, the tool may describe an ellipse in the air but may still provide a circular hole in the material.

Not only can the present invention result in more accurate procedures, the method of moving only a few of the axes of the robot may also result in faster machining/hole-cutting. For example, when all of the axes of a robot are active, the working speed may be limited to about 65 mm/s.

Figure 5:
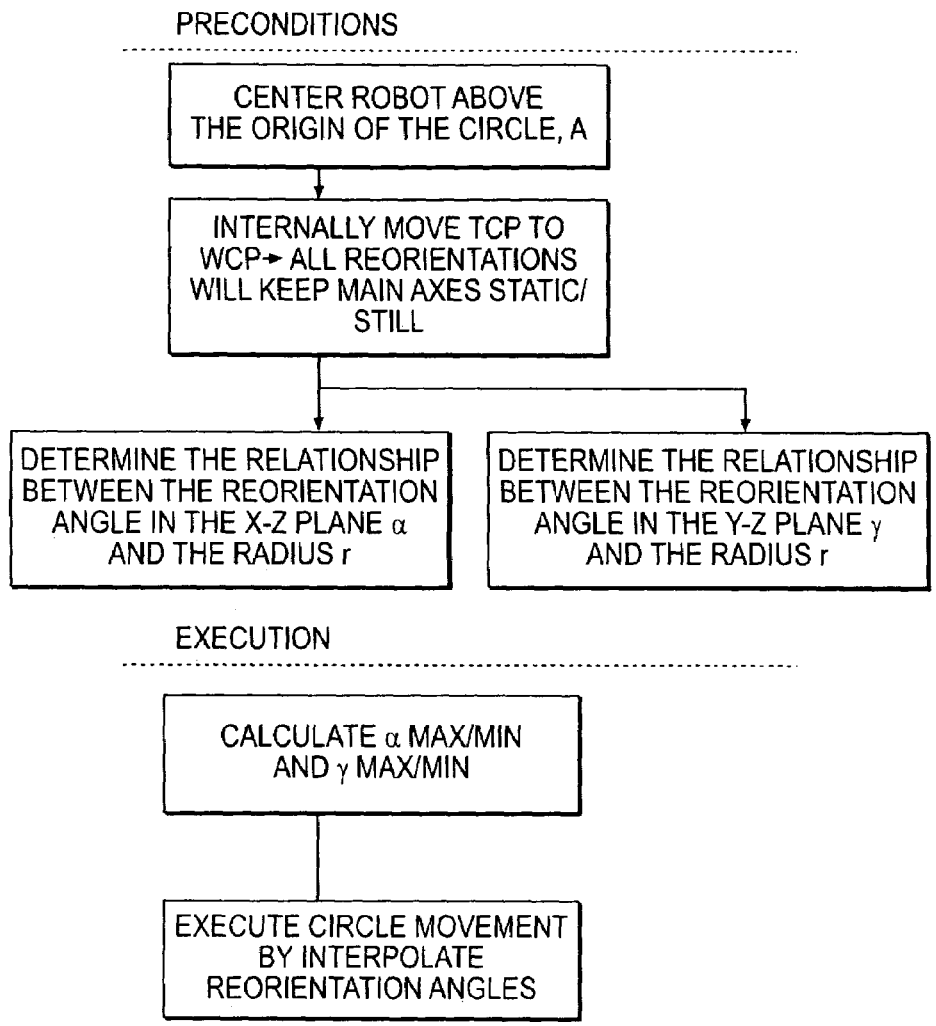
FIG. 5 represents a flow-chart that illustrates elements of a method according to one embodiment of the present invention.

FIG. 5 provides a flow-chart that illustrates elements of an embodiment of a method according to the present invention. This method is for cutting a circular hole in a workpiece. According to this embodiment, the robot is centered above the origin of the circle. The tool center point (TCP) is moved to coincide with the wrist center point (WCP). All reorientations of the robot will maintain immobile the axes that are to be static or still during the hole cutting. Next, it is determined how the axes that are to be mobile during the hole cutting art to be moved to carry out the hole cutting. For example, a relationship in a first plane is determined between a reorientation angle α and a radius of the circle to be cut. This first plane may be the X-Z plane in a XYZ coordinate system. During this measurement, the other axes of the robot may remain stationary. A similar relationship for an angle γ may then be determined in a second plane. This second plane may be perpendicular to the first plane. This second plane may be the Y-Z plane. During the determination of the relationship between the reorientation angle γ and the radius, the angle α may be held at 0. As the relationships are determined, maximum and minimum values may be determined for each angle. After determining the angles that the relevant axes are displaced to carry out the hole cutting, the hole may be cut.

Figure 6:
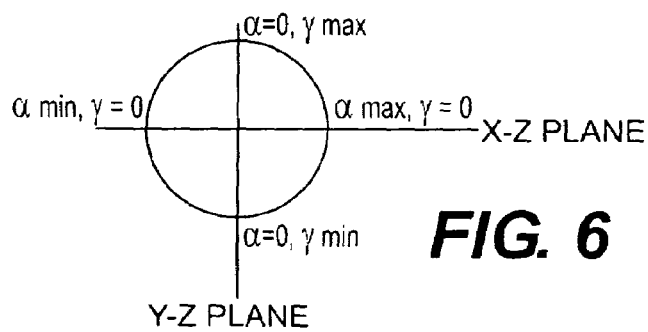
FIG. 6 represents a diagram that illustrates measurements according to the embodiment of the method described in the flow-chart shown in FIG. 5.

FIGS. 6 and 7 illustrate the angles, planes, determination of the angles and robot and tool involved in the example discussed above. As can be seen in FIGS. 6 and 7, this relationship determines the extremes of wrist movement about one axis that will take place during the hole cutting.

Other embodiments may be carried out similarly. For example, it is first determined which axes may be held stationary to cut a hole or carry out some other process. Then, it is determined how to move the robot in the remaining axes to accomplish the desired procedure. The procedure is then carried out.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

We claim:

1. A method for controlling a robot including a plurality of arms each movable about at least one axis, the method comprising:
   cutting a hole in a workpiece with the robot by moving only two or three of the arms about their respective axes while maintaining all remaining arms immobile.

2. The method according to claim 1, wherein the robot has six axes.

3. The method according to claim 1, wherein a wrist of the robot is moved in two axes during the cutting of the hole.

4. The method according to claim 1, wherein only a wrist of the robot is moved during the cutting of the hole.

5. A method for controlling a robot including a plurality of arms each movable about at least one axis, the method comprising:
   centering a tool over a center of a region of a workpiece in which a hole is to be cut;
   moving a tool center point to coincide with a wrist center point;
   determining a relationship between a first reorientation angle in a first plane and a limit of movement of the robot in the first plane during cutting of the hole;
   determining a relationship between a second reorientation angle in a second plane and a limit of movement of the robot in the second plane during cutting of the hole;
   calculating maximum and minimum values of the first reorientation angle and the second reorientation angle; and
   cutting a hole in a workpiece with the robot by moving only two or three of the arms about their respective axes while maintaining all remaining arms immobile.

6. The method according to claim 5, wherein the center of the region is the center of the hole.

7. The method according to claim 6, wherein the hole is circular.

8. The method according to claim 5, wherein the first plane and the second plane are perpendicular.

9. The method according to claim 5, wherein the robot has six axes.

10. The method according to claim 5, wherein the tool is a waterjet cutting tool.

11. The method according to claim 5, wherein the first plane is an X-Z plane and the second plane is a Y-Z plane in a system of XYZ coordinates.

12. The method according to claim 5, wherein only a wrist of the robot is moved during the procedure.

13. An industrial robot, comprising:
   a plurality of interconnected arms, each arm being movable about at least one axis;
   a tool arranged on one of the arms; and
   a controller operative to control movement of the arms and tool to cut a hole in a workpiece while moving only two or three of the arms about their respective axes while immobilizing all remaining arms during cutting of the hole.

* * * * *